May 17, 1955
W. E. DONALDSON ET AL
2,708,610
THRUST BEARING
Filed Nov. 17, 1951
2 Sheets-Sheet 1
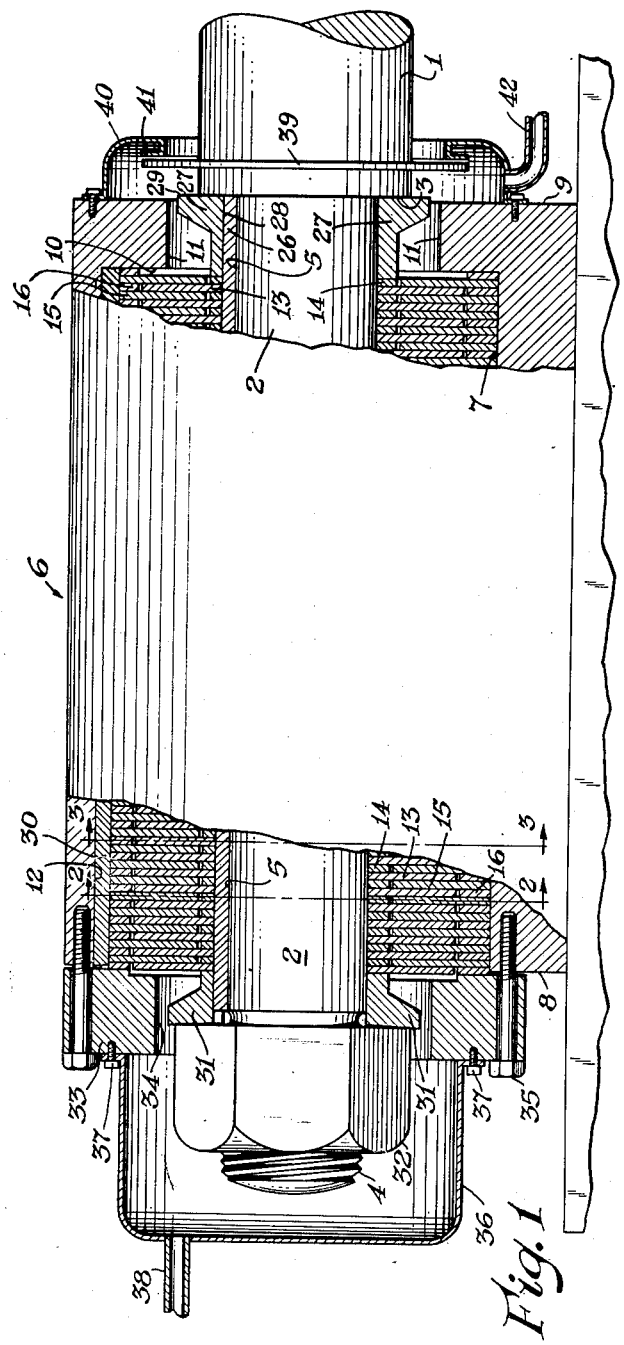
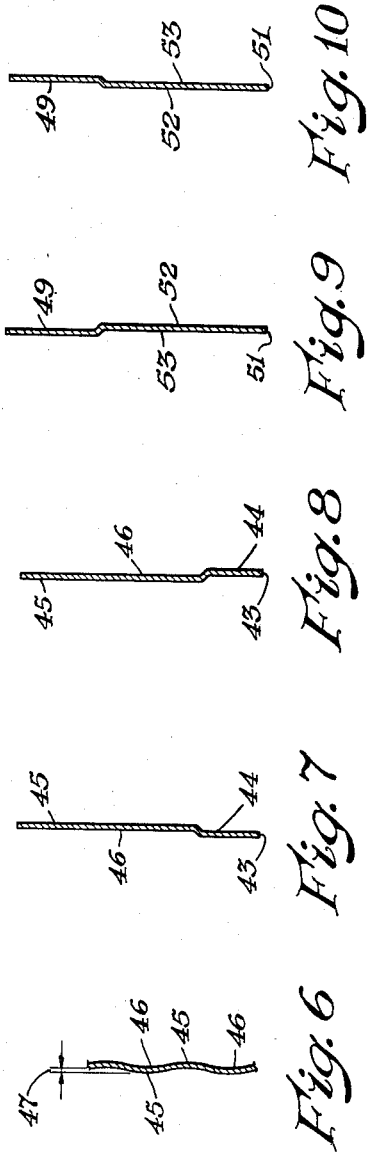
INVENTORS
Walter E. Donaldson
Alden W. Hanson
BY
Griswold & Burdick
ATTORNEYS.

May 17, 1955   W. E. DONALDSON ET AL   2,708,610
THRUST BEARING
Filed Nov. 17, 1951
2 Sheets-Sheet 2

INVENTORS.
Walter E. Donaldson
Alden W. Hanson

BY Griswold & Burdick
ATTORNEYS.

United States Patent Office 2,708,610
Patented May 17, 1955

2,708,610

THRUST BEARING

Walter E. Donaldson and Alden W. Hanson, Midland, Mich., assignors to The Dow Chemical Company, Midland, Mich., a corporation of Delaware Application November 17, 1951, Serial No. 256,880

6 Claims. (Cl. 308—162)

The invention relates to bearings. More particularly the invention concerns and improved bearing among the objects being the provision of a multiple collar bearing which is compact, easily constructed and assembled, and capable of sustaining thrust loads as well as radial loads.

Various designs of multiple collar thrust bearings are known in which provision is made for taking the end thrust of a rotating shaft such as a propeller shaft of a ship. One of the disadvantages of conventional multiple collar thrust bearings is their bulkiness which precludes their use with shafts that are parallel to each other and close together where the thrust bearings are to be located. Another difficulty is that the shaft collar members are formed integrally with the shaft itself, thereby necessitating the provision of a relatively large shaft diameter at the collar portion and a laborious machining operation on this portion to form therein the shaft collars. Still another difficulty is providing adequate lubrication for the bearing surfaces.

It is an object of the invention to provide a multiple collar or disc thrust bearing for a shaft capable of taking very large endwise thrust loads in which the foregoing and other disadvantages are overcome. Other objects and advantages will become apparent from the following description taken in connection with the accompanying drawing in which is set forth, as illustrative, an embodiment of the invention.

In the drawing—

Fig. 1 is a side elevation partly in section showing the assembled thrust bearing provided on the end of a shaft.

Fig. 6 is a fragmentary cross section on the line 6—6 of Figs. 4 and 5.

Fig. 7 is a fragmentary cross section on the line 7—7 of Fig. 4.

Fig. 8 is a fragmentary cross section on the line 8—8 of Fig. 4.

Fig. 9 is a fragmentary cross section on the line 9—9 of Fig. 5.

Fig. 10 is a fragmentary cross section on the line 10—10 of Fig. 5.

Figure 2:
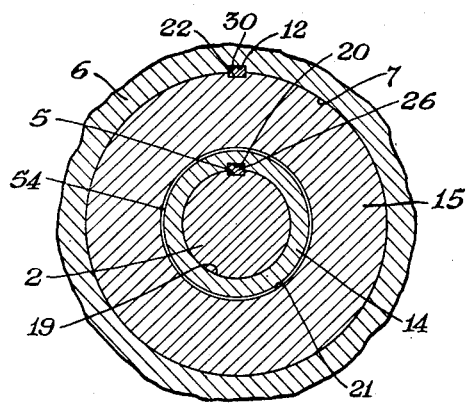
Fig. 2 is a fragmentary cross section of the thrust bearing on the line 2—2 of Fig. 1.

Referring to the drawing in detail, there is shown one end of a shaft 1, for which the thrust bearing is provided, the shaft having a reduced diameter section 2 the inner end of which forms the shoulder 3 with the shaft. The outer end has a threaded portion 4. A keyway 5, in the form of a longitudinal groove, extends from the threaded portion 4 to the shoulder 3.

The reduced diameter section 2 of the shaft is shown extending through the bearing housing 6 which is in one piece and provided with a longitudinal cylindrical bore 7 extending from one end 8 of the housing to near the other end 9 of the housing, thereby providing a shoulder 10 at the inside of the end 9. The end 9 is provided with an opening 11 concentric with the bore 7. A keyway 12, in the form of a longitudinal groove, is formed in the bore of the housing and extends the length of the bore 7.

The reduced diameter section 2 of the shaft and the cylindrical bore 7 are provided with thrust and radial load bearing elements in the form of two sets of flat annuli or collars with spacers between them. One of these sets of collars, designated by numeral 13 and their spacers designated by numeral 14, referred to hereinafter as shaft collars and shaft spacers, respectively, is keyed to the shaft 2. The other of these sets of collars, designated by numeral 15 and their spacers designated by numeral 16, referred to hereinafter as housing collars and housing spacers, respectively, is keyed to the housing in the bore 7.

Figure 3:
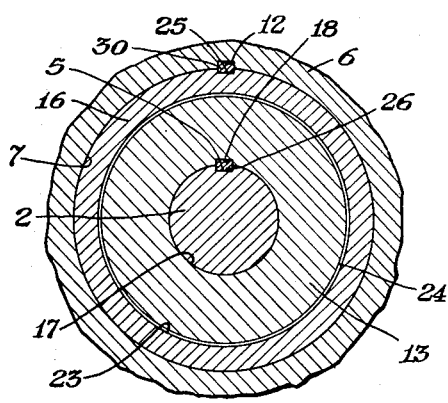
Fig. 3 is a fragmentary cross section of the thrust bearing on the line 3—3 of Fig. 3.

The individual shaft collars of the set of shaft collars 13 are broad faced rings all alike having a central bore 17 (Fig. 3) to admit the reduced diameter section 2 of the shaft. Each shaft collar is provided with a keyway notch 18 adapted to register with the keyway 5. The individual shaft spacers of the set of shaft spacers 14 are narrow faced rings, all alike, having a central bore 19 (Fig. 2) to admit the reduced diameter section 2 of the shaft. Each shaft spacer is provided with a keyway notch 20 like notch 18.

The individual housing collars of the set of housing collars 15 are broad faced rings, all alike, having a central bore 21 (Fig. 2) slightly larger in diameter than the outside diameter of a shaft spacer 14. Each housing collar has an outside diameter permitting it to fit into the bore 7 of the bearing housing and a keyway notch 22 in the periphery adapted to register with the keyway 12. The individual housing spacers of the set of housing spacers 16 are narrow faced rings, all alike, having an inside periphery 23 (Fig. 3) slightly larger than the periphery 24 of a shaft collar. The periphery of each housing spacer is provided with a keyway notch 25 adapted to register with keyway 12 in the bearing housing.

The housing spacers have the same thickness as the shaft spacers and this thickness is greater than that of the collars of the shaft and housing all of which have the same thickness. Having the spacers thicker than the collars allows lubricant to reach the bearing surfaces as will be apparent as the description continues.

In assembling the collars and spacers on the shaft and in the bearing housing a key 26 is inserted in the shaft keyway 5, the key extending the length of the keyway. A spacer 27 for the inner end of the reduced diameter section 2 of the shaft in the form of a collar of suitable length and having a keyway 28 adapted to register with keyway 5, is slipped onto section 2 with the keyway 28 registering with the key 26 in keyway 5 of the reduced diameter section 2. The spacer 27 is moved along section 2 until the spacer abuts the shoulder 3. The reduced diameter section 2 is then inserted into the bore 7 of the housing through opening 11. In this position, the inner end 29 of the spacer 27 extends into the bore 7 beyond the shoulder 10 a distance equal to about the thickness of a housing spacer. A key 30 adapted to fit into the housing keyway 12 is placed in position in the keyway 12, the key extending the length of the bore 7. A housing spacer 16 is inserted into the bore 7, with the keyway notch 25 positioned over the key 30, and moved along the bore 7 into contact with the shoulder 10. Next a housing collar is inserted into the bore 7, with the keyway notch 22 positioned over the key 30, and moved along the bore into contact with the previously introduced housing spacer. A shaft spacer is placed upon the reduced diameter section 2, with the keyway notch 20 positioned over the shaft key 26, and moved along the section 2 into contact with the spacer collar 27. The shaft spacer is followed by a shaft collar with the keyway notch 18 positioned over shaft key 26, the shaft collar being moved along the section 2 into contact with the previously placed shaft spacer. This procedure, of placing a housing spacer followed by a housing collar in the housing followed by a shaft spacer and then a shaft collar on the reduced diameter section of the shaft, is continued until a sufficient number of spacers and collars are placed in position to occupy the length of the bore 7, and end up with a housing spacer as the last of these elements introduced into the housing, and a shaft collar as the last of these elements placed on the reduced diameter section 2. A spacer collar 31 is then placed over the outer end of the reduced section 2 followed by a nut 32 which is turned on the threaded portion 4 and tightened so as to tightly compress the set of shaft spacers and shaft collars between the spacer collars 27 and 31. A housing head 33, having a central opening 34, is secured to the housing 6 by cap screws 35. The housing head 33 retains the housing collars and housing spacers in place in the bore 7.

A cup 36 for directing lubricant into the bearing is secured to the housing head 34 by cap screws 37. A pipe connection 38 is provided in the cap for the admission thereto of lubricant. A lubricant slinger ring 39 is provided on shaft 1 near shoulder 3. Secured to the end 9 of the housing is an open-ended lubricant retaining collar 40 having an inwardly turned edge 41 around one open end which is adjacent to the slinger ring 39. A pipe connection 42 is provided in the lubricant retaining collar 40 by means of which lubricant, discharged from the bearing into the collar, may be withdrawn for reuse.

Figure 11:
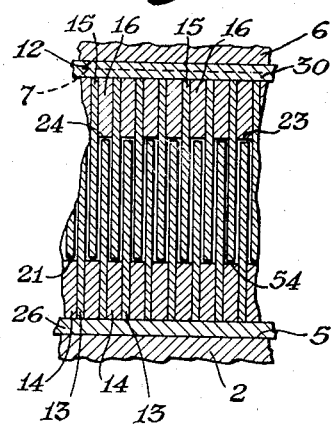
Fig. 11 is an enlarged view of a portion of Fig. 1.

Although the shaft collars 13 and housing collars 15 are shown in Figs. 1 and 11 as having plane faces, it has been found that better lubrication results and higher thrust loads may be carried when the faces of either the set of housing collars or the set of shaft collars are radially ribbed or fluted so as to present a wavy face to an adjacent collar. Collars to this kind are illustrated in Figs. 4 to 10, inclusive.

Figure 4:
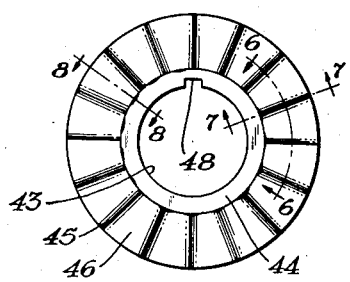
Fig. 4 is an alternate form of a shaft thrust collar.

Referring more particularly to Figs. 4, 7, and 8, there is shown a radially wave shaft collar provided with a central opening 43 which is made large enough for the collars to be fitted over the reduced diameter section 2 of the shaft in similar manner to, and in place of, the plane faced shaft collars 13. The radially waved shaft collars are provided with an annular portion 44 around the central opening. The annular portion 44 is flat on both sides for a width equal to the width of a shaft spacer. The remainder of the faces of the collar is radially waved as by pressing the collar between suitable dies. The waved surfaces provide a series of crests 45 alternating with valleys 46 on each face of the collar, the valleys being about 0.05 inch in depth, for example, below the plane of the crests as indicated at 47 in Fig. 6. The overall diameter of the waved shaft collars is the same as that of the plane shaft collars. Each waved shaft collar is provided with a keyway notch 48 adapted for use with shaft key 26.

Figure 5:
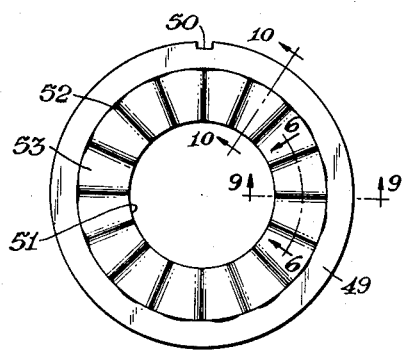
Fig. 5 is an alternate form of a housing thrust collar.

Referring more particularly to Fig. 5, there is shown a radially waved housing collar. This is provided with an outer annular portion 49 which is flat on both sides, the width of the flat portion being the same as that of a housing spacer. The diameter of the waved collar is the same as that of a plane faced collar 15, which it may replace, the outer annular portion 49 has cut into it a keyway opening 50 for use with housing key 30. The waved collar is provided with a central opening 51 which is slightly larger than the outside diameter of the shaft spacers. The remainder of the collar is provided with a series of radial flutes or waves 52, in similar manner to the waved shaft collars, radiating from the central opening 51.

It is manifest that one may use a set of radially waved shaft collars with a set of plane housing collars or a set of radially waved housing collars with a set of plane shaft collars, or as shown in Fig. 1, both the shaft collars and the housing collars may have plane faces.

Referring more particularly to Figs. 1 and 11, it is manifest that in operation the radial load of shaft 1 is transmitted by the outer edge 54 of the shaft spacers to the inner edge of the central bore 21 of the housing collars and by periphery 24 of the shaft collars to the inside periphery 23 of the housing spacers; and the endwise thrust loads of the shaft 1 are transmitted by either face of the shaft collars to the adjacent faces of the housing collars. The endwise thrust loads and radial loads are carried in similar manner when either the plane faced housing collars or the plane faced shaft collars are replaced by a radially waved housing collar or a radially waved shaft collar, respectively. However, when the radialy waved collars are used, lubrication is facilitated.

Lubrication is obtained by introducing the lubricant into one end of the bearing housing, as through the pipe connection 38. The lubricant thus introduced passes over the bearing faces and bearing edges of the housing and shaft collars and the bearing edges of the housing and shaft spacers in traversing from one end of the bearing to the other and is discharged from the bearing into the oil-retaining collars 40.

We claim:

1. In a multiple collar thrust bearing the combination comprising a one-piece housing having a bore extending therethrough; a shaft having a portion adapted to extend through the bore; a set of housing bearing collars in the said bore, each of said housing bearing collars being disc-like and having a central opening adapted to encircle the said portion of the shaft and a periphery adapted to fit the said bore; a housing bearing collar spacer between each housing bearing collar adjacent the outer periphery thereof, each said housing bearing spacer being thicker than a housing bearing collar; a set of shaft bearing collars on the said portion of the shaft, each of said shaft bearing collars being disc-like and having a central opening adapted to fit the said portion of the shaft and a thickness the same as a housing bearing collar; a shaft bearing collar spaced on the said shaft between each shaft bearing collar adjacent to the inner periphery thereof, each said shaft bearing collar spacer having the same thickness as a housing bearing collar spacer, said housing bearing collars alternating with the said shaft bearing collars from end to end of the said bore; clamping means secured to the housing adapted to retain in the housing the housing bearing collars and housing bearing collar spacers; and clamping means secured to the shaft adapted to retain the shaft bearing collars and shaft spacers on the shaft.

2. A multiple collar thrust bearing according to claim 1 in which the housing bearing collars have radially waved faces.

3. A multiple collar thrust bearing according to claim 1 in which the shaft bearing collars have radially waved faces.

4. In a multiple collar thrust bearing the combination comprising a housing having a cylindrical bore extending through the housing; a shaft having an end portion adapted to extend through the said cylindrical bore; a set of housing bearing collars in the said cylindrical bore, each of the housing bearing collars of the said set being in the form of an annulus having greater breadth than thickness and adapted to fit into the said bore and encircle the shaft; a housing bearing collar spacer in the said cylindrical bore between each housing bearing collar, each of said housing bearing collar spacers being in the form of an annulus of the same diameter as the housing bearing collars, and a thickness greater than the housing bearing collars; a set of shaft bearing collars on the said end portion of the shaft, each of said shaft bearing collars being in the form of an annulus having a greater breadth than thickness and adapted to fit onto the shaft, the outside diameter of the said shaft bearing collars being less than the inside diameter of the said set of housing bearing collar spacers, and the thickness of said shaft bearing collars being the same as the housing bearing collars; a shaft bearing collar spacer on the said shaft between each shaft bearing collar, each of said shaft bearing collar spacers being in the form of an annulus having the same inside diameter as the said shaft bearing collars and an outside diameter less than that of the inside diameter of the said housing bearing collars and the thickness of the said shaft bearing collar spacers being the same as the housing bearing collar spacers, said housing bearing collars of the said set thereof alternating with said shaft bearing collars of the set thereof from end to end of the said cylindrical bore; clamping means secured to the housing adapted to hold the said sets of housing bearing collars and spacers in place in the housing; and clamping means secured to the shaft adapted to hold the shaft bearing collars and spacers of the said sets thereof in place on the shaft.

5. A multiple collar thrust bearing according to claim 4 in which the housing bearing collars have radially waved faces.

6. A multiple collar thrust bearing according to claim 4 in which the shaft bearing collars have radially waved faces.

References Cited in the file of this patent

UNITED STATES PATENTS

| | | |
|---|---|---|
| 563,134 | Campbell | June 30, 1896 |
| 1,068,987 | Dianovszky | July 29, 1913 |
| 1,076,399 | Wagner | Oct. 21, 1913 |
| 1,126,071 | Peter | Jan. 26, 1915 |
| 1,309,763 | McKennitt | July 15, 1919 |
| 1,626,237 | Hodgkinson | Apr. 26, 1927 |
| 2,362,667 | Schmidt | Nov. 14, 1944 |
| 2,380,179 | Huber | July 10, 1945 |

FOREIGN PATENTS

| | | |
|---|---|---|
| 12,419 | Switzerland | June 24, 1896 |
| 11,995 | Great Britain | 1901 |